Dec. 20, 1955 — T. G. MAIRS ET AL — 2,727,675
SHIPPING CONTAINER
Filed Nov. 9, 1951 — 3 Sheets-Sheet 2

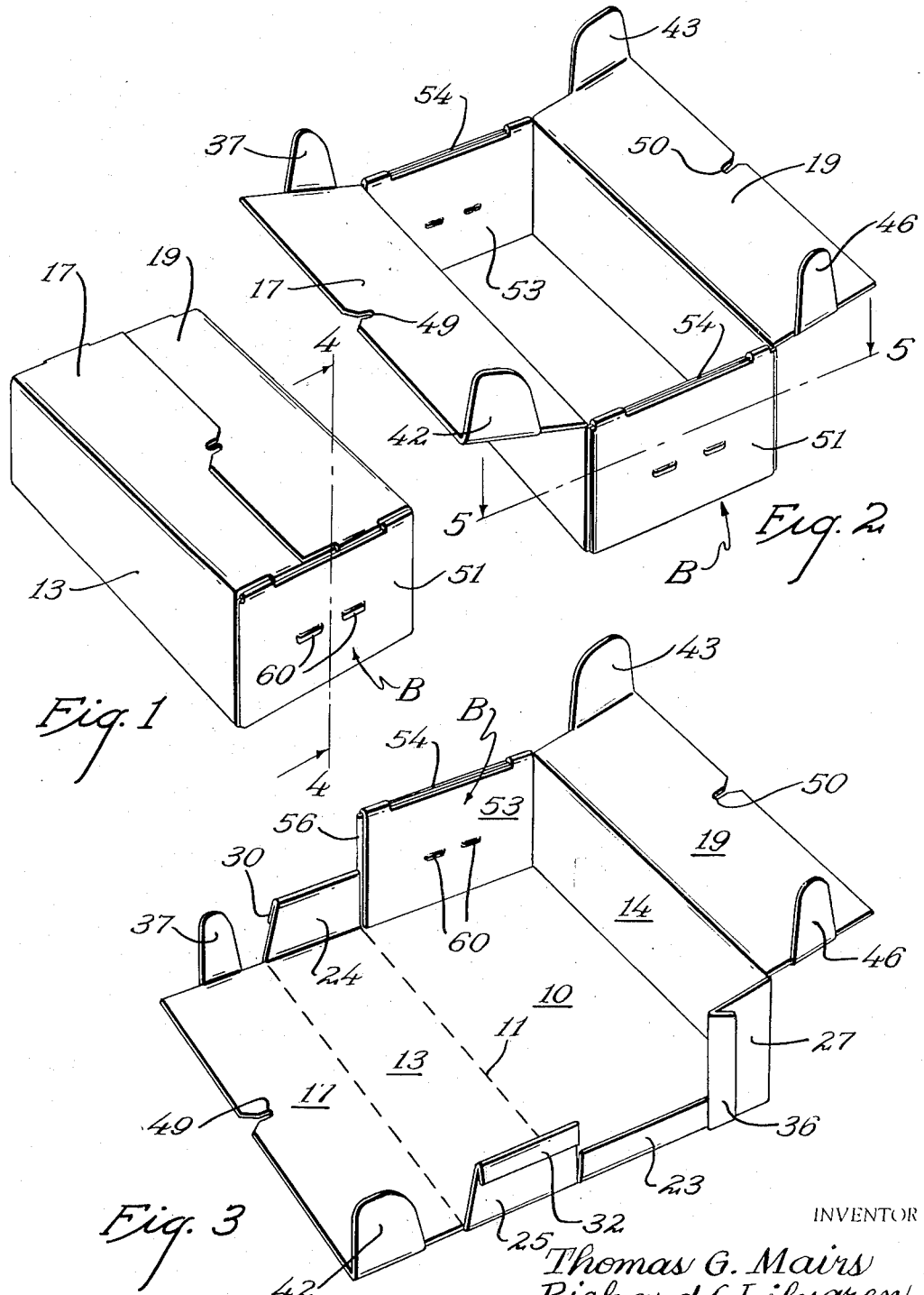

INVENTOR
Thomas G. Mairs
Richard C. Lilygren
BY Robert M. Dunning
ATTORNEY

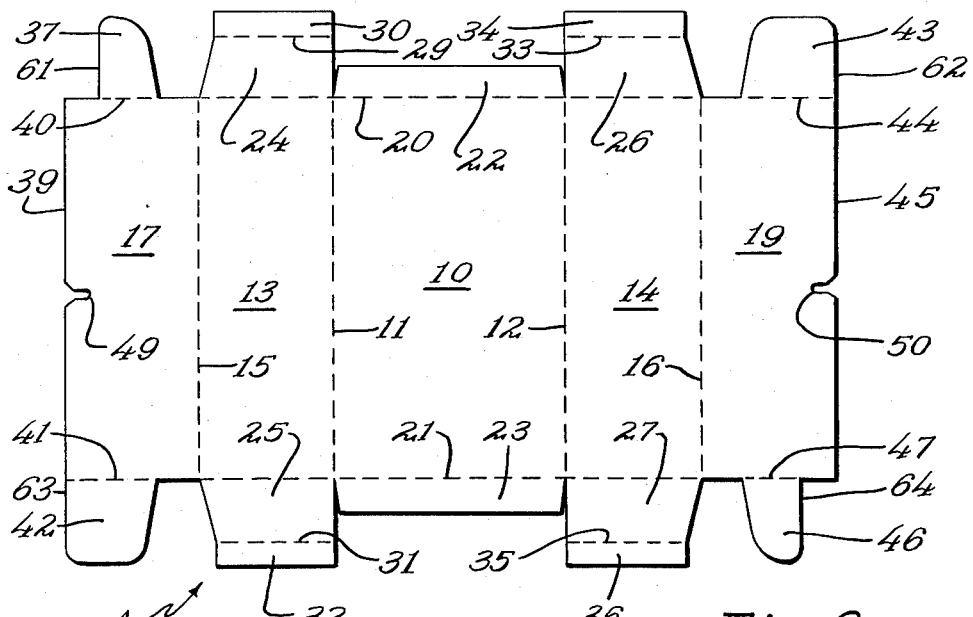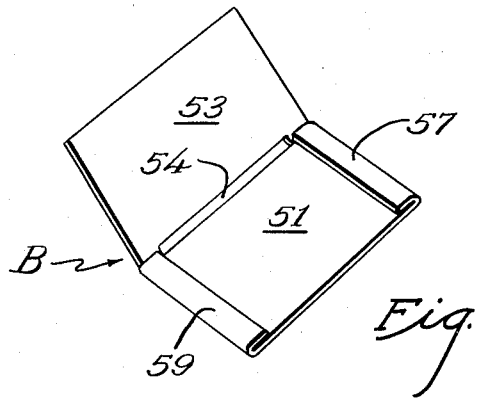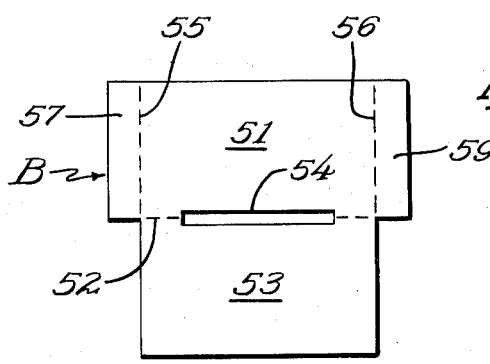

United States Patent Office 2,727,675
Patented Dec. 20, 1955

2,727,675
SHIPPING CONTAINER

Thomas G. Mairs and Richard C. Lilygren, St. Paul, Minn., assignors to Waldorf Paper Products Company, St. Paul, Minn., a corporation of Minnesota Application November 9, 1951, Serial No. 255,694

10 Claims. (Cl. 229—23)

This invention relates to an improvement in shipping container and deals particularly with a container suitable for shipping meat products, fowl and the like.

Certain types of meat products, chickens, turkeys and the like are occasionally shipped in shipping containers designed to hold a predetermined number or weight of the product. Companies producing such products, and particularly poultry products are not well equipped to set up containers of usual type and to tape or stitch them. Accordingly it is desirable to provide a shipping container which may be shipped and stored in a flat or substantially flat condition, and yet which may be easily and quickly set up without requiring special equipment for the purpose.

A feature of the present invention lies in the provision of a shipping container having a body portion and a pair of end portions which may be easily assembled together to form a complete container. The shipping container is so designed that it may be shipped and stored in a flat condition. The ends of the container are so designed that they may be set up into complete form at the container manufacturing plant, or alternatively may be shipped flat in the event the customer is provided with a stitching device by means of which the ends may be stitched together. In such an event the ends are usually assembled from time to time and stored in flat assembled form until desired for use.

A feature of the present invention resides in the provision of a simple container which may be easily erected into set up form and which locks the various parts together when thus assembled. The body of the container is provided with flaps which engage into the doubled end walls of the container. When in place the flaps lock in such a manner that the container will remain assembled throughout shipping and handling. At the same time the container may be readily disassembled if desired for return and reuse.

A feature of the present invention resides in the provision of a container having a body including a bottom wall and side walls hingedly connected thereto and including flaps on the respective body walls. The container includes end members formed by folding the container forming material along the upper edge of the end wall and by stitching or otherwise securing the two thicknesses of material together at a point spaced from the edges thereof. As a result the flaps of the side and bottom walls engage between the thicknesses of the end walls. Means are provided for locking the flaps in assembled position.

A further feature of the present invention resides in the provision of a container of the type described including overlapping top panels each provided with flaps which extend between the thicknesses of container stock forming the ends of the container. These flaps assist in holding the container closed so that it can be handled and stored without taping if desired.

These and other objects and novel features of the present invention will be more clearly and fully described in the following specification and claims.

In the drawings forming a part of the specification:

Figure 1 is a perspective view of the container in closed position showing the construction thereof.

Figure 2 is a perspective view of the container with the cover panels thereof folded into open position.

Figure 3 is a view similar to Figure 2 showing the container in partially assembled form.

Figure 6 is a diagrammatic view of the container blank of which the container is formed.

Figure 7 is a diagrammatic view of the blank of which the ends of the container are formed.

Figure 8 is a perspective view of an end of the container in partially assembled condition.

Figure 4:
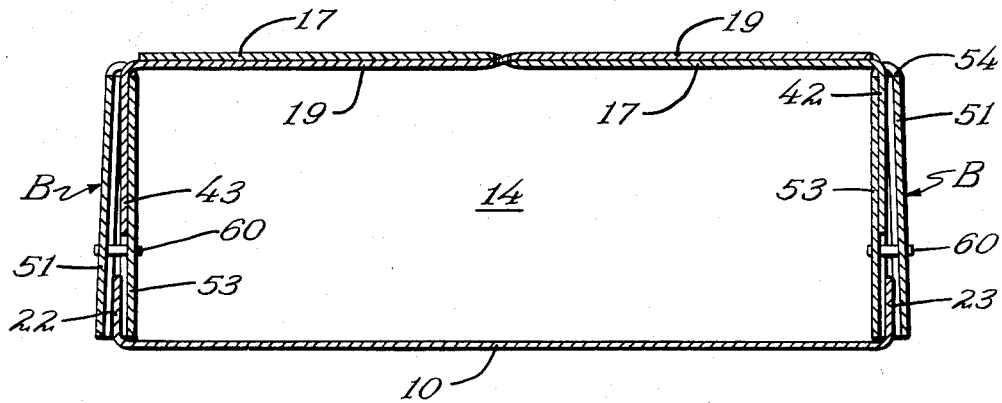
Figure 4 is a vertical sectional view through the container, the position of the section being indicated by the line 4—4 of Figure 1.

The container includes a body A and two similar end members illustrated in general by the letter B. Both ends B are identical in form and thus may be constructed of the same die.

The body portion A includes a bottom panel 10 which is foldably connected along parallel fold lines 11 and 12 to side wall panels 13 and 14. The side wall panels are foldably connected along their upper edges on fold lines 15 and 16 to top cover panels 17 and 19. These top cover panels are of a width somewhat greater than half the width of the bottom panel 10 so that these cover panels will overlap in closed position thereof. The bottom panel 10 is connected along parallel fold lines 20, 21 to end flaps 22 and 23 respectively. The side wall panel 13 is connected along extensions of the fold lines 20 and 21 to corner flaps 24 and 25. The side wall panel 14 is likewise connected along extensions of the fold lines 20 and 21 to corner flaps 26 and 27.

The corner flap 24 is connected along a fold line 29 to a locking flap 30. The corner flap 25 is similarly connected along a fold line 31 to a locking flap 32. The corner flap 26 is connected along a fold line 33 to a locking flap 34. The corner flap 27 is also connected along a fold line 35 with a locking flap 36. The fold lines 29 and 33 are in alignment as are also the fold lines 31 and 35.

The cover panel 17 is provided with a locking tab 37 which is spaced from the free end 39 of the cover panel 17. This locking tab 37 is connected to an edge of the cover panel by a fold line 40. A parallel fold line 41 connects the opposite edge of the cover panel 17 to a locking tab 42 which is substantially wider than the tab 37 and extends flush with the free end 39 of the cover panel.

The cover panel 19 is similarly arranged. A locking tab 43 is foldably connected to an edge of the panel 19 along a fold line 44 which is aligned with the fold line 40 and the fold line 20. The locking tab 43 extends flush with the free end 45 of the cover panel. A relatively narrower locking tab 46 is hingedly connected to the opposite edge of the cover panel 19 along a fold line 47. The fold line 47 is aligned with the fold lines 21 and 41.

A notch 49 extends centrally into the cover panel 17 from the free end 39 thereof mid-way between the fold lines 40 and 41. A similar notch 50 extends into the cover panel 19 from the free end 45 thereof mid-way between the fold lines 44 and 47. The purpose of these notches will be later more clearly described.

Each end member B is provided with an outer panel 51 which is hingedly connected along a fold line 52 to an end lining panel 53. A slot 54 extends throughout most of the length of the fold line 52 and is spaced from the ends of these panels. Fold lines 55 and 56 define opposite ends of the panel 51 and foldably connect this panel with locking tabs 57 and 59. In assembling the end members B, the locking tabs 57 and 59 are first folded along the fold lines 55 and 56 to overlie the panel 51. When in this position the end members are arranged as illustrated in Figure 8. The lining panel 53 is next folded over the flaps 57 and 59. Stitches 60 are then inserted through the panels 53 and 51 at points spaced from any of the edges thereof. When the stitches 60 have been inserted the ends are fully assembled and may be stored until required for use.

In assembling the container the flaps 22 and 23 at opposite ends of the bottom panel 10 are turned upwardly into right angular relation with the bottom 10 as illustrated in Figure 3 of the drawings. The assembled end units B are then urged downwardly over these flaps 22 and 23, the flaps extending between the locking flaps 57 and 59 and the panel 51. As the flaps 22 and 23 are then combined by the locking flaps 57 and 59, the end members B can not move transversely and can only be removed by an upward sliding movement.

Figure 5:
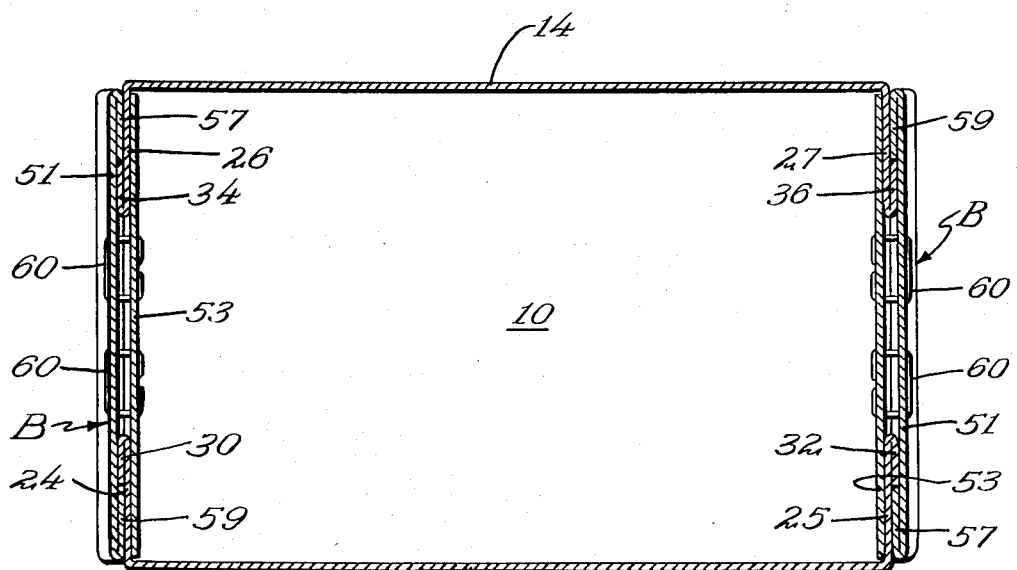
Figure 5 is a horizontal sectional view through the container, the position of the section being indicated by the line 5—5 of Figure 2.

One side wall such as 13 is next prepared by folding the corner flaps 24 and 25 thereof upwardly into right angular relation to the panel 13 as diagrammatically illustrated in Figure 3. The locking flaps 30 and 32 are next folded downwardly to overlie the outer surfaces of these corner flaps 24 and 25. The doubled locking flaps and corner flaps are then inserted between the panels 51 and 53 of both end units B. In other words, while holding the corner flaps and locking flaps in the position shown in Figure 3, the panel 13 is folded along the fold line 11 until it is at right angles to the bottom panel 10. In this position the corner flaps 24 are completely inserted and the locking flaps 30 and 32 engage against the edges of the locking flaps 57 or 59 of the end units B. In other words, the edge of the locking flaps 30 and 32 abut against the edges of the locking flaps 57 or 59 as is indicated in Figure 5. When thus engaged the side walls can not be folded downwardly into the position shown by the panel 13 in Figure 3. When both of the side walls are pivoted upwardly and the various locking tabs inserted between the panels 51 and 53, the container appears as indicated in Figure 2 of the drawings.

To complete the closing operation after the container is filled, the cover panels 17 and 19 are folded downwardly, the two cover panels inter-engaging in the notches 49 and 50. The end of the panel 19 bearing the longer locking tab 43 is beneath the corresponding portion of the free end 39 of the cover panel 17. Similarly the end of the cover panel 17 bearing the locking tab 42 is beneath the overlapping portion of the free end 45 of the cover panel 19. When thus arranged the container appears as indicated in Figure 1 of the drawings.

It will be noted that in the closed position of the container an edge 61 of the locking tab 37 engages in abutting relation with an edge 62 of the locking tab 43, these edges being spaced from the fold lines 15 and 16 a distance totaling substantially the width of the bottom panel 10. Similarly in this closed position an edge 63 of the locking tab 42 abuts against an edge 64 of the locking tab 46. Thus the cover panels must be distorted slightly in inserting the tabs in place and once they are in place, they definitely resist accidental disengagement.

When it is desired to open the container the cover panels 17 and 19 may be hinged upwardly by flexing these panels slightly out of their normal plane and drawing the locking tabs from the slots 54 between the panels 51 and 53. If it is desired to disassemble the container for storage or return purposes, the end wall units B may be pulled upwardly to slide the various locking tabs on the corner flaps out of engagement with the locking flaps 57 and 59 of the end walls. It is obvious that when the locking tabs of the cover panels are engaged in the slots 54, the ends are firmly connected and can not come out of place.

In accordance with the patent statutes, the principles of construction and operation of the present shipping container have been described, and while it has been endeavored to set forth the best embodiments thereof, it is desired to have it understood that obvious changes may be made within the scope of the following claims without departing from the spirit of the present invention.

We claim:

1. A container including a body portion and end wall members detachably connected thereto, the body portion including a bottom wall and side walls foldably connected thereto, said side walls having end flaps foldably connected thereto at each end thereof, locking flaps on said end flaps and foldably connected thereto to fold into surface contact therewith, said end members including a pair of wall panels connected together intermediate the edges thereof, and locking flaps on one of said wall panels of each end member folded between said wall panels of said end members, said locking flaps on said end members engaging said locking flaps on said end flaps in edge abutting relation.

2. A container including a body portion and a pair of end wall members, the body portion including a bottom panel and side walls foldably connected thereto, and flaps foldably connected to each end of said bottom panel and side wall panels, locking flaps foldably connected to said end flaps of said side wall panels and folded into surface contact with said end flaps, the edges of said locking flaps being directed outwardly toward said side walls, said end members including a pair of wall panels connected together intermediate the edges thereof, said wall panels of said end members accommodating said end flaps and said locking flaps therebetween, and means on one of said wall panels of said end members engageable in edge abutting relation against the edges of said locking flaps to hold said side walls in right angular relation to said bottom wall.

3. The structure described in claim 2 and in which said means on one of said wall panels of said end members comprises locking flaps hingedly connected to opposite edges of said one wall panels of said end members and folded inwardly between said wall panels of said end members.

4. An end wall structure for a container including a pair of wall panels of substantially equal size foldably connected together along one edge thereof, a pair of locking flaps foldably connected to opposite edges of one of said wall panels on each side of said one edge, said locking flaps being folded into substantial surface contact with the wall panel to which they are attached and extending between said wall panels, and means securing said wall panels together at a point spaced from the edges of the panels and near the center thereof.

5. A container including a body portion and a pair of end wall members, said body portion including a bottom panel, side wall panels foldably connected to opposite sides thereof, and a top panel secured to at least one of said side wall panels along a fold line, said bottom panel and said side wall panels having end flaps foldably connected to opposite ends thereof, locking flaps foldably connected to the end flaps of said side wall panels, said locking flaps being folded back into substantial surface contact with said end flaps of said side wall panels, and each having a free end directed outwardly toward said side wall panels, said end wall members including a pair of end wall panels foldably connected along the upper edge thereof, the fold line connecting said end wall panels being slotted intermediate its ends, means connecting said end wall panels at a point spaced from all of the edges thereof, and locking flaps extending along opposite sides of certain of said end wall panels and folded between said end wall panels, said locking flaps on said end wall panels having a free edge directed inwardly, the free edge of said locking flaps of said end wall panels engaging in abutting relation with the free edge of the locking panels on said end flaps of said side wall panels.

6. The structure described in claim 5 and including locking tabs hingedly connected to opposite sides of said top panel and foldable through said slot and extending between said end wall panels.

7. The structure described in claim 5 and in which both of said side wall panels are provided with top panels, and including locking tabs on opposite sides of said top panels engageable through the slot and extending between said end wall panels.

8. A container including a body portion and a pair of detachable end wall portions, the body portion including a bottom panel, side wall panels foldably connected to opposite edges thereof and top panels foldably connected to said side wall panels, said bottom panel and said side wall panels each having an end flap at each end thereof, said end flaps being folded into right angular relation with the panel to which they are secured, locking flaps on each of said end flaps of said side wall panels, said locking flaps being folded into surface contact with the end flap to which they are secured and having a free edge directed outwardly toward said side wall panels, said end members including a pair of panels connected along a fold line, said fold line being slotted intermediate its ends, means connecting the panels in parallel relation at a point spaced from all of the edges of the end wall panels, and locking flaps foldably connected to side edges of one end wall panel of each end member, said last named locking flaps being folded against the end wall panel to which they are secured and having a free end directed inwardly, said free end of said locking flaps of said end members engaging the free edges of said locking flaps on said end flaps of said side wall panels, said top panels being of proper length to overlap and locking tabs on said top panels engageable through said slots.

9. The structure described in claim 8 and in which two of said locking tabs are spaced from the free end of the top panel to which they are secured so that they will not overlap.

10. The structure described in claim 8 and in which said locking tabs are provided with side edges designed to abut against the side edge of the locking tab of the other cover panel when the locking tabs of both cover panels are extending into said slot.

References Cited in the file of this patent

UNITED STATES PATENTS

| | | |
|---|---|---|
| 2,089,345 | Davis et al. | Aug. 10, 1937 |
| 2,143,588 | Wenzel | Jan. 10, 1939 |
| 2,404,067 | Hill | July 16, 1946 |
| 2,409,673 | Glascoff et al. | Oct. 22, 1946 |
| 2,511,189 | Woodward | June 13, 1950 |
| 2,588,232 | Grant | Mar. 4, 1952 |

FOREIGN PATENTS

| | | |
|---|---|---|
| 12,671 | Great Britain | 1908 |
| 387,503 | Great Britain | Feb. 9, 1933 |